May 22, 1934.                I. GOYTISOLO                1,960,150
SHOCK ABSORBER SUITABLE FOR AUTOMOBILES AND OTHER VEHICLES
              Filed May 14, 1932            3 Sheets-Sheet 1
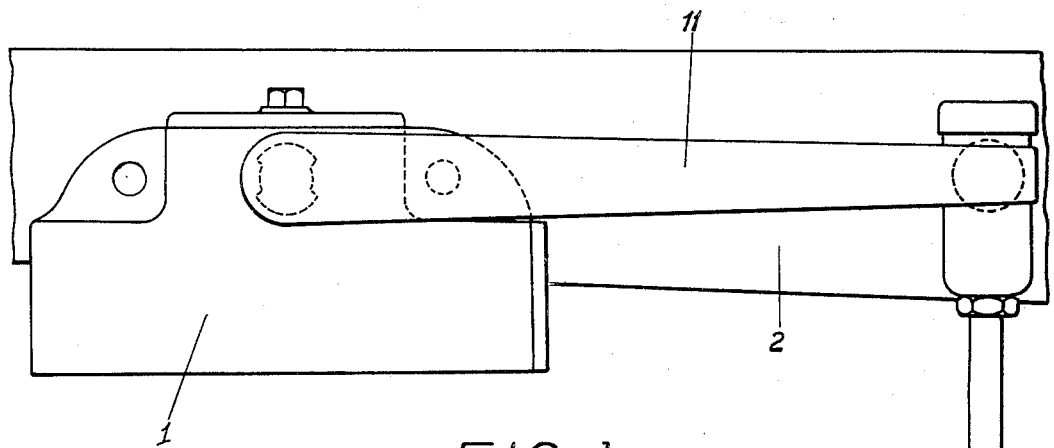
FIG.1.
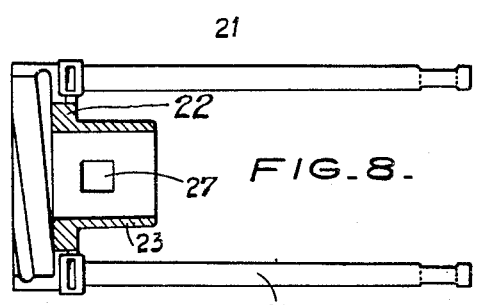
FIG.8.
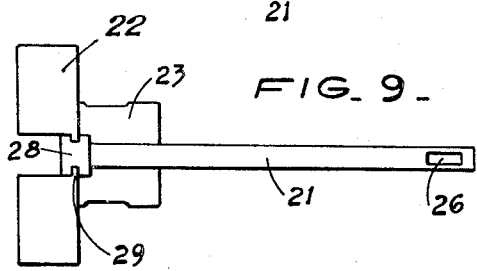
FIG.9.
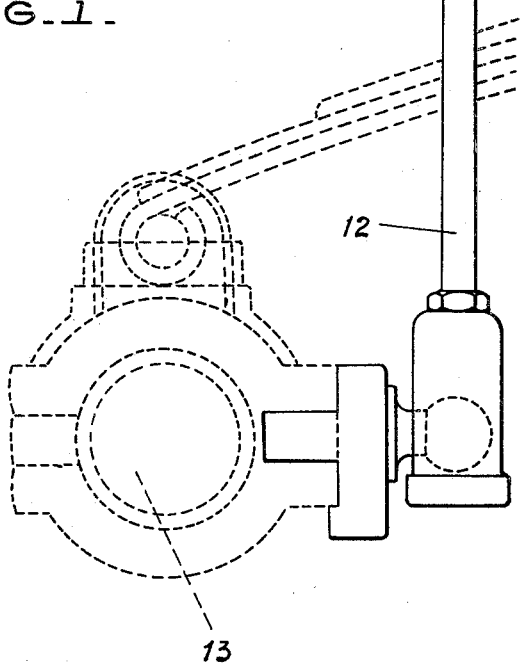
Inventor:
I. Goytisolo,
By E. F. Wenderoth
Atty May 22, 1934.  I. GOYTISOLO  1,960,150
SHOCK ABSORBER SUITABLE FOR AUTOMOBILES AND OTHER VEHICLES
Filed May 14, 1932   3 Sheets-Sheet 2

Inventor:
I. Goytisolo,
by E. F. Wenduroth
Atty

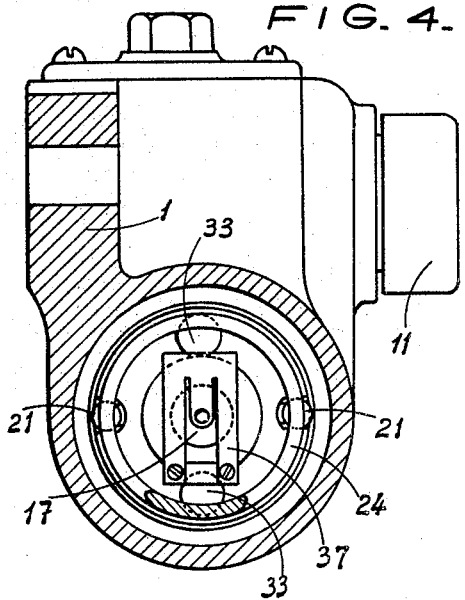
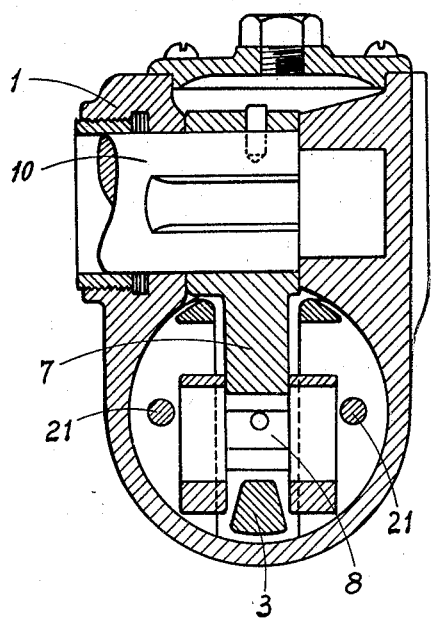
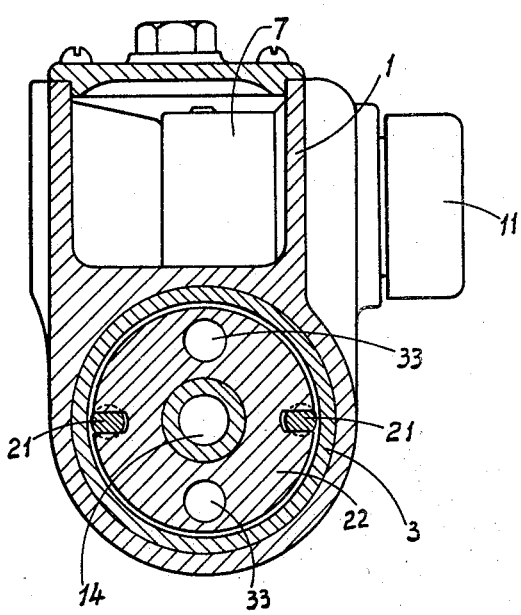
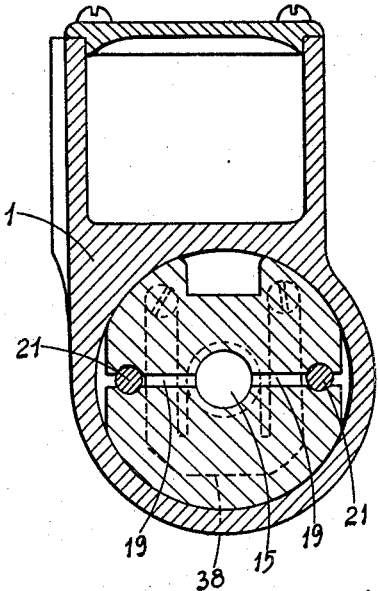

Patented May 22, 1934

1,960,150

UNITED STATES PATENT OFFICE 1,960,150

SHOCK-ABSORBER SUITABLE FOR AUTOMOBILES AND OTHER VEHICLES

Ignacio Goytisolo, Barcelona, Spain

Application May 14, 1932, Serial No. 611,418
In Spain May 29, 1931

4 Claims. (Cl. 188—88)

My invention relates to apparatus for absorbing shocks both in motor cars and in various types of vehicles, thus counteracting the rebound of the springs, as a reaction to the stresses produced under the influence of irregularities in the road-surface.

This shock-absorber is of the hydraulic type and comprises as is usual a cylinder immovably fixed to the frame of the car. In the interior of the cylinder a movable piston is provided which, by means of an arm and connecting rod or other suitable contrivance, is coupled to the axle of the car-wheels, and as a consequence follows all movements of ascent and descent of said axle caused by inequalities in the road-surface and the rebound of the springs.

The shock-absorber, according to my invention possesses important advantages over all others now actually in use, one of such advantages comprising its double action movement, that is, it not only absorbs the rebound of the spring when the wheel passes over an obstacle, but also, after the wheel has entered into a pronounced depression, it prevents the sudden descent of the body due to the relaxation of the sustaining force of the spring.

According to my invention the cylinder (in which the piston moves with a reciprocating movement corresponding in proportion to that of the axle) is closed at both extremities and is fixed to the frame of the vehicle in a horizontal position. In the upper part of the cylinder and approximately in its centre an orifice is pierced which provides communication with a chamber immovably fixed to the cylinder. In the interior of said chamber is a shaft with its exterior arm or crank coupled to the wheel axle. The shaft within the chamber is united to an arm, which, entering the cylinder, is connected by means such as a slide-bearing and axle to the piston, so that the movement of the wheel axle causes a reciprocating movement of the piston within the cylinder.

A central conduit in the piston constitutes communication between the right and left chambers that form the cylinder heads. This conduit is normally closed at both ends by suitable valves governed by springs.

In addition to the previously mentioned valves transverse channels constitute a mode of communication between the two cylinder chambers through the intermediary of the central conduit of the piston. These channels are regulated by one or more valves of the slide-bolt type disposed substantially parallel to the axis of the piston. Said slide-bolts open and close the channels last mentioned.

These slide-valves are so disposed that in one direction they are submitted to the pressure of the liquid in the piston-chamber, while in the opposite direction they are under the influence of a cylindrical spiral spring, so that their movement depends on the difference in values of these two forces.

The spring which acts on these sliding valves and which constitutes the main-spring of the shock-absorber is not under tension when the shock-absorber is in its normal or rest position, but when it is displaced from said rest position, the spring mentioned is submitted either to tension or compression, as the case may be.

One of the extremities of such spring is attached to the valves or to a part united thereto, the other extremity being fixed to the bottom of the cylinder or to an element which is practically immovable during the operation of the shock-absorber.

The annexed drawings illustrate the shock-absorber according to my invention.

Fig. 1 is a side elevation of the apparatus, together with the adjacent parts of the vehicle.

Figure 2:
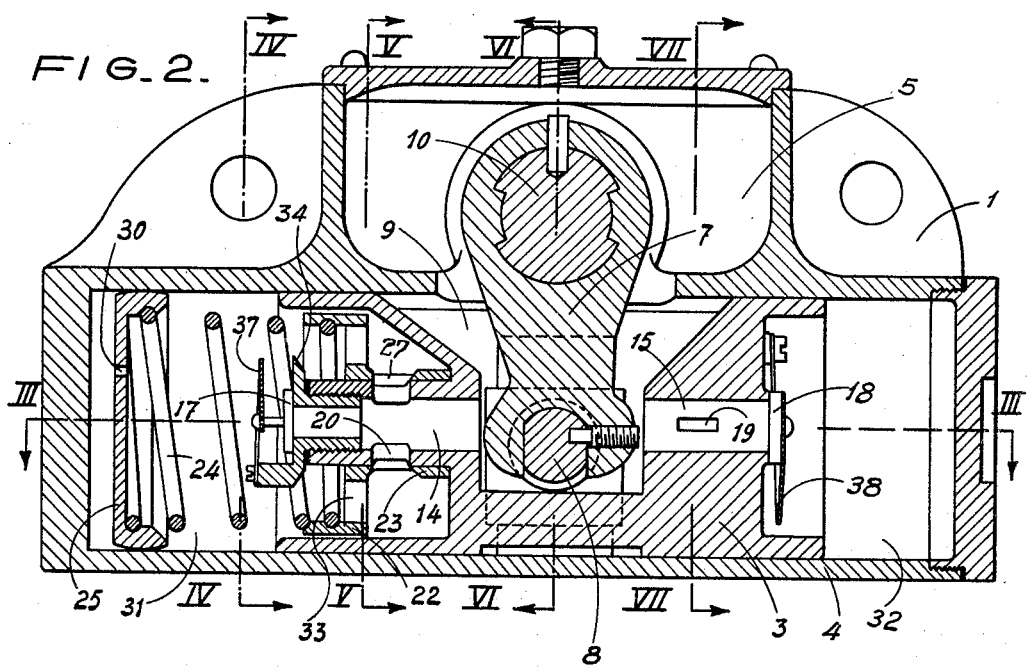
Fig. 2 is a vertical section on a larger scale of the shock-absorber, along the line of the axis of the cylinder.
Figure 3:
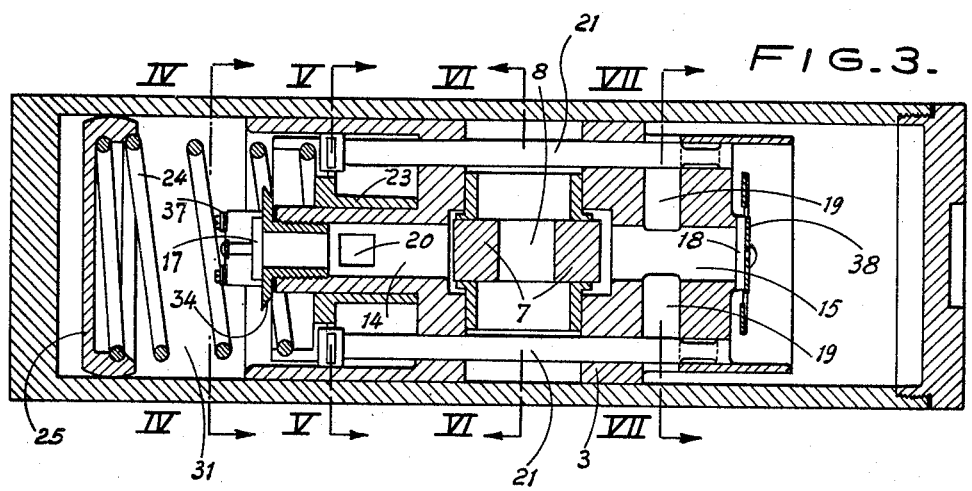
Fig. 3 is a horizontal section of the same along the line III—III of Fig. 2.

Figs. 4, 5, 6, and 7 are transverse sections of the shock-absorber taken along the lines IV, V, VI and VII of Figs. 2 and 3.

Fig. 8 shows the system of slide-valves, partly in section, in position corresponding to Fig. 3.

Fig. 9 shows the same slide-valves as they are in position corresponding to Fig. 2.

As seen in the drawings, the shock-absorber is composed of a body 1 fixed to the frame 2 the lower portion forming the working part, or cylinder 4 and the upper portion forming the chamber 5. The piston 3 reciprocates in the interior of the cylinder, and being coupled to the axle of the vehicle, of necessity follows every movement thereof.

The connecting mechanism between the piston and wheel-axle is as follows:

The piston 3 is connected by means such as a slide-bearing and axle 8 to the coupling rod 7 which is fixed on the shaft 10 of an exterior lever or crank 11 which in turn is coupled to the wheel-axle 13 by the connecting rod 12.

The cylinder 4 is completely filled with oil or other suitable liquid, and the upper chamber 5 is nearly full of the same liquid. The piston 3 has two axial conduits 14—15 communicating with the central cavity 9 of the piston, providing communication between the two chambers 31—32 of the cylinder. The conduit 14 is closed by means of a valve 17 which is operated by a spring 37 and opens in the direction of the chamber 31.

In a similar manner the conduit 15 is closed by the valve 18 operated by a spring 38 and this valve opens in the direction of the chamber 32.

In addition liquid passes through the channel 19 in the right-hand part of the piston, establishing communication between the chamber 32 of the cylinder and the central conduit 15 of the piston; another transverse channel 20 in the left-hand part of the piston provides communication between the chamber 31 and the central conduit 14.

The passage of liquid through the channels 19—20 is interrupted by a system of slide-valves, constituted by two bolts 21 united to the sliding-collar 23 (as illustrated in Figs. 8 and 9). The said bolts regulate the conduit 19 and the sliding-collar 23 regulates the openings 20. This sliding-collar 23 forms part of the cap or plate 22 and constitutes a prolongation of said plate. Each bolt 21 is preferably provided with a head 28 the rim of which may be cut as in 29 the bolts being embedded at two opposed points in the cap or plate 22. In this way the movable collar 23 and the valves 21 form a unit and move as one piece. To regulate the flow of liquid the sliding-collar 23 is provided with openings 27 which correspond with the openings 20 and the bolts present slots 26 which correspond with the conduit 19.

The plate or cap 22 which unites the two slide-bolts 21 is subject to the action of a spring 24 constituting the main spring of the apparatus. This spring, at one end, is fixed in the plate 22 and at its other extremity is fixed to a lower plate 25, the function of which will be explained hereafter.

When the shock-absorber is at rest, the spring 24 is also at rest, and it is placed in tension or compression only when the piston is in motion.

As seen in Figs. 3 and 4 the plate or cap 22, in the preferred form, has two apertures 33 at two diametrically opposed points corresponding to the entrances of the cross-channel 20 in the cap, to permit the free passage of liquid through this channel.

The plate 25 acts as a support for the spring 24. Its function is to automatically adjust the shock-absorber to the load of the vehicle.

The plate 25 has a small orifice 30 which permits the liquid to pass slowly from the right face of the plate to the left, or vice versa, but prevents a rapid flow of the liquid.

For instance: when the absorber is in action the plate 25 remains stationary, as the liquid cannot pass from one surface thereof to the other, owing to the speed at which the shock-absorber operates; on the other hand, when the load of the car is altered, with corresponding flexure of the springs, accompanied by variation in the position of the axle 13 and the piston 3, then, supposing the vehicle to be at rest, the liquid can pass slowly from one face to the other of plate 25 under the action of spring 24 until the latter is free from tension. Hence this plate 25 constitutes an automatic medium for graduating the shock-absorber for varying loads of the vehicle.

The action of this shock-absorber is as follows:

When the wheel passes over an obstacle the axle 13 rises rapidly and the piston moves to the right (see Figs. 2 and 3). Due to this movement the valve 17 opens, permitting the liquid to pass freely towards the chamber 31 of the cylinder. At the same time, since the slide-bolt unit 21—23 is retained by the spring 24 this unit remains immovable till the movement of the piston 3 towards the right brings the left-hand edge 34 of the piston into contact with the cap 22. In this position the slots 26 of the slide-bolts 21 correspond with channel 19 of the piston, and the apertures of conduit 20 of the piston are closed by the sliding-collar 23 thus the liquid passes from the chamber 32 to the chamber 31 through conduit 19, channels 15 and 14, and the valve 17. In this manner the ascension of the wheel-axle is effected without difficulty in passing over any obstacle. After passing over such obstacle the rebound of the car-springs has a tendency to react violently on the axle 13 of the vehicle in a downward direction, jolting the piston towards the left at the same time, and this is the moment when the absorber comes into action. The valve 17 is closed by the pressure of the liquid in the cylinder, and the slide-valves unit 21—23 maintains the conduit 20 closed and the conduit 19 open. By reason of the closure of conduit 20 the liquid is compressed in the chamber 31 of the cylinder; in consequence the slide-bolts unit 21—23 is subjected to two opposing forces; one, the force of the spring 24 (which, having been put into tension by the movement of the piston toward the right, tends to maintain the unit 21—23 in the left position), and the other opposing force is the pressure of the liquid in the chamber 31 acting on the heads 28 of the slide-bolts 21. If the compressing force of the liquid in the chamber 31 be greater than the force exercised by the spring 24 the slide-bolts move to the right relatively to the piston 3, thus opening the conduit 20 to permit the liquid in the chamber 31 to pass through the central conduit 14 to the chamber 32 by the opening of the valve 18 enabling the piston and consequently the axle of the vehicle to return smoothly to its normal position.

At first the aperture of the conduit 20 is small, due to the tension of the spring 24 but, corresponding to the movement of the axle 13, the piston 3 moves towards the left and the tension of the spring 24 diminishes, gradually opening the conduit 20. Thus the braking action produced gradually decreases and is almost independent of the velocity of the piston and fluidity of the liquid, being dependent, as it is, almost entirely on the tension of the spring 24.

When, instead of passing over an obstacle, the wheel enters a depression, the shock-absorber acts in an opposite sense. On entering such rut or depression the axle 13 of the wheel descends and the piston moves toward the left. This movement is possible becase firstly, the valve 18 opens readily to allow entrance of liquid to the chamber 32 of the cylinder, and secondly, because upon movement of the piston 3 toward the left, the conduit 20 corresponds to the slots 27 permitting the liquid to pass freely from the chamber 31 to the chamber 32 in consequence of which the piston moves toward the left. On leaving the rut the wheel axle has a tendency to rise, carrying with it the piston 3 to which it is coupled; this movement is, however, counteracted, because the valve 18 being closed, and the channel 19 having been already closed simultaneously with the opening of the conduit 20, the liquid is compressed in the chamber 32 of the cylinder.

In this case the slidebolts-unit 21—23 is subjected to opposing forces; one, the pressure of the liquid contained in the chamber 32 of the cylinder and the other, the pressure of the spring 24. This latter having been compressed by the movement toward the left of the piston 3 tends to drive the slide-bolts unit 21—23 to the right in relation to the piston. Equally in this case, should the pressure of the liquid contained in the chamber 32 be superior to that exercised by the spring 24 the slide-bolts glide to the left with relation to the piston 3 and open the channel 19, permitting a flow of liquid from the chamber 32 to the channels 15—14 and from there to the chamber 31 through the opening of the valve 17 and, since the force of the spring 24 diminishes in accordance with the movement of the piston 3 towards the right, the aperture of the channel 19 which at first is small, gradually enlarges as the piston and wheel axle return to their normal position.

I claim:

1. A hydraulic shock-absorber suitable for automobiles and other vehicles, comprising a cylinder fixed to the frame of the vehicle and a piston connected to the wheel-axle and moving within the cylinder in consonance with the movements of the axle, a longitudinal conduit in the interior of the piston, providing communication between the two opposite chambers of the cylinder, a system of valves disposed at opposite ends of said conduit, which open in the direction of the respective chambers, two transverse channels in communication with the central longitudinal conduit, a system of sliding valves, putting said conduit into communication with said chambers, a main spring connected to said sliding valves in such manner that on opening one of the transverse channels the other automatically closes, said valves being united to the main spring of the shock-absorber and subjected in one direction to the pressure of the liquid contained in the cylinder chambers, and in the other to the action of the main-spring, the flow of liquid through the valves tending to produce a condition of equilibrium.

2. In a hydraulic shock-absorber according to claim 1, wherein said system of sliding valves include a cap enclosing the longitudinal conduit of the piston, and two longitudinal bolts united to said cap and following every movement thereof; said cap having apertures which can correspond with the opening in the cross channel at one end of the piston, while the longitudinal bolts traverse the cross channel at the other end of the piston, and are provided with suitable slots which correspond to the openings in that part of the channel.

3. In an hydraulic shock-absorber according to claim 1, said main-spring being fixed at one extremity to the slide-valves, and at the other a supporting member which is practically stationary in relation to the cylinder, so that when the piston is in its normal or rest position the spring is without tension, and when the piston moves the spring is either compressed or distended.

4. In a hydraulic shock-absorber according to claim 1, a supporting member for the main-spring formed by a movable plate which constitutes an auxiliary piston, so disposed as to move in the interior of the cylinder, said main-spring of the shock-absorber being fixed by one extremity to said plate; said plate having a small hole therein permitting the passage of the liquid from one face of the plate to the other, causing the plate to gradually vary its position in the cylinder but preventing a rapid displacement so that the plate cannot follow the rapid movement of the piston and serves as a fixed support for the spring, but can move slowly varying its position according to the load of the vehicle, with the result that the spring, in its normal position is out of tension, even when the load varies.

IGNACIO GOYTISOLO.